May 28, 1957 W. E. KOCK 2,794,172

SIGNAL ROUTING APPARATUS

Filed Jan. 29, 1954 3 Sheets-Sheet 1

INVENTOR
W. E. KOCK
BY Harry C. Hart
ATTORNEY

May 28, 1957

W. E. KOCK 2,794,172

SIGNAL ROUTING APPARATUS

Filed Jan. 29, 1954

3 Sheets-Sheet 2

INVENTOR
W. E. KOCK
BY Harry C. Hart
ATTORNEY

INVENTOR
W. E. KOCK
BY Harry C. Hart
ATTORNEY 2,794,172
Patented May 28, 1957

2,794,172

SIGNAL ROUTING APPARATUS

Winston E. Kock, Basking Ridge, N. J., assignor to Bell Telephone Laboratories, Incorporated, New York, N. Y., a corporation of New York Application January 29, 1954, Serial No. 406,975

11 Claims. (Cl. 333—11)

This invention relates to structures and arrangements for interconnecting a plurality of transmission paths and for directing or routing energy arriving by one of said paths to a particular one of the other paths while preventing its delivery to another. It relates more particularly to nonreciprocal interconnectors, coupling devices or couplers, and is illustrated in its application to a carrier telephone substation.

A general object of the invention is to interconnect three circuit elements or transmission paths in such a way that a source of wave energy associated with the first path actuates the second but not the third; a source associated with the second actuates the third but not the first; and a source associated with the third path actuates the first but not the second; and to accomplish this result with a minimum of power loss.

A more specific object of the invention is to interconnect a telephone transmitter and a telephone receiver located at a telephone substation with a transmission path or medium which extends to another station in a fashion such that all of the energy originating at the local transmitter reaches the medium and the distant transmitter while all of the energy originating at the distant transmitter and arriving by way of the medium reaches the local receiver, none of it being lost in the other of these two local elements.

A further object is to interconnect a plurality of transmission paths or circuit elements in such a way that maximum power transfer occurs between certain ones of said paths or elements while transmission is substantially prevented between certain other ones of said paths or elements.

The well known 8-terminal hybrid coil has long served an important purpose in low frequency telephone circuits. In one of its common uses, it interconnects a telephone transmitter and a telephone receiver which form part of a local telephone station with a transmission line, and it operates to direct energy originating at the transmitter into the line and to direct energy incoming from the line to the receiver. It operates in this fashion, however, only when a balancing impedance element or network is connected to its fourth pair of terminals, and consequently the energy routing function is always accompanied by an energy loss in the balancing network.

In that part of the frequency range in which wavelengths are of the order of a few centimeters, the directed transmission of electromagnetic wave energy is commonly carried out with hyperfrequency electromagnetic wave guide structures. Wave guide counterparts of the 8-terminal hybrid coil have been developed. A number of these are described by G. C. Southworth in "Principles and Applications of Waveguide Transmission" (Van Nostrand, 1950). In general every such structure is provided with four ports, each port corresponding to one of the four pairs of terminals of the low frequency hybrid coil, and in operation a balancing net is connected as a dummy load to one of these ports. Such structures are therefore no more economical of power than their low frequency predecessors.

It has recently been discovered that when a strip of ferrite material is placed within a wave guide structure, e. g., one of rectangular cross section and extending length-wise of the structure, parallel with its shorter side and offset from the center of the cross section, and when to this ferrite strip there is applied a steady magnetic field, then the wave propagation speed or phase velocity in the guide differs for the two directions of transmission, being increased in one direction and diminished in the other direction as compared with its magnitude in the absence of the ferrite and the field. This nonreciprocal phase velocity feature of ferrite-bearing wave guides is discussed by J. H. Rowan in the Bell System Technical Journal for November 1953, vol. 32, page 1333. Certain practical applications and uses of this phenomenon are disclosed in an application of S. E. Miller, Serial No. 362,193, filed June 17, 1953.

In accordance with the present invention, a wave guide structure containing a strip of ferrite material located in this fashion and subjected to a magnetic field is returned upon itself to form a reentrant structure which defines a closed path for hyperfrequency electromagnetic waves therein. Access to this closed path is provided by way of three ports which, in one form, are equally spaced apart around the path. When the frequency of energy applied at one of these ports is coordinated, in the fashion discussed in detail below, with the phase velocity differential, the energy thus applied to a first port arrives by way of two paths at the second port where it appears in additive phase relation and so emerges there. It also travels by way of two paths to the third port where it arrives, however, in subtractive phase relation so that no energy emerges at this third port. The device is symmetrical, so that the same behavior obtains and the same explanation applies, whichever one of the ports be selected as the "first," provided only that the second and third are always taken in the same angular direction around the closed loop path from the first.

In an alternative form, two of the ports may be located at the same point of the closed path, one being coupled to it by an aperture in the shorter side of the reentrant guide structure and the other by an aperture in its longer side. With this construction the coupling and decoupling effects as between the several ports are secured by virtue of the phase behavior difference which obtains between ports so located.

In practice, one of the ports may be coupled to a telephone transmitter, another to a telephone transmission medium, and the third to a telephone receiver. In operation, then, all of the energy entering the closed path from the transmitter is directed to the medium, none of it reaching the receiver, and all of the energy arriving by way of the medium is directed to the receiver, none of it reaching the transmitter. Thus, the objects of the hybrid coil are accomplished without resort to any balancing net and without the energy loss which takes place in the balancing net of the prior art.

Such a ferrite-loaded wave guide structure is in principle operative at frequencies much lower than so-called microwave frequencies. However, as a practical matter, it is restricted to microwave frequencies because at lower frequencies its dimensions are required to be excessive. When it is desired to employ the principles of the invention at lower frequencies, a nonreciprocal acoustic wave guide structure may be employed. Thus an acoustical wave-guiding pipe may be closed upon itself to form a closed path so that it may support acoustic compression waves, and a steady air current or wind may be caused to proceed around the closed path. The phase velocity of compression waves, which advance in both directions, is now increased in one angular direction and diminished in the opposite angular direction by the addition or subtraction of the velocity of the wind which blows with the waves in one direction and against them in the other direction. The wind may be caused to blow around the closed path by any desired means, e. g., by the movement of one wall of the wave-guiding structure with respect to the others and by the provision of air-circulating vanes thereon. Three symmetrically disposed ports may be connected to the closed path for application and withdrawal of acoustic wave energy. When the wind speed is coordinated with the frequency of such wave energy in the fashion explained below, the acoustic device behaves, from the standpoint of addition and subtraction of wave energy, in the manner discussed above. The wavelengths of sound waves in air are such that compact devices of entirely practicable dimensions may be constructed to operate in this fashion in the frequency range of 5,000 to 50,000 cycles per second.

The invention will be fully apprehended by reference to the following detailed description of preferred illustrative embodiments thereof taken in connection with the appended drawings, in which.

Figure 1:
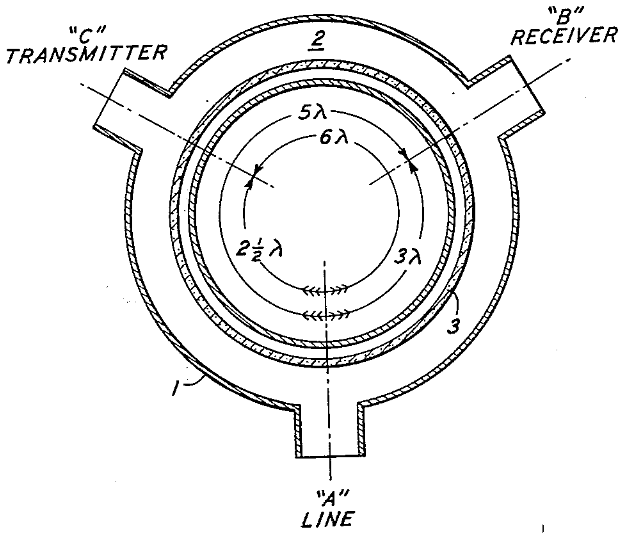
Fig. 1 is a cross-sectional view of a hyperfrequency electromagnetic wave guide structure embodying the nonreciprocal phase velocity feature of the invention.
Figure 2:
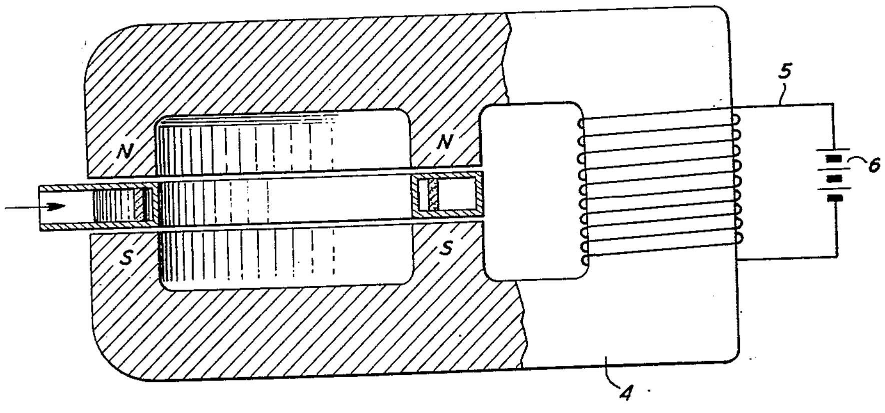
Fig. 2 is a schematic diagram showing apparatus for applying a steady magnetic field to the apparatus of Fig. 1, thus endowing it with the nonreciprocal phase velocity feature of the invention.

Referring now to the drawings, Fig. 1 shows a re-entrant wave-guiding structure 1 defining a closed loop path 2 for wave energy within it. This structure is preferably of a cross section which, though rectangular, is not square, i. e., its cross section has two shorter sides and two longer sides. A strip 3 of ferrite material is placed within the wave guide structure and offset from the center, i. e., closer to one side than to the other. For guided waves of the dominant mode, this strip is arranged parallel to the shorter sides of the wave guide structure and connected at its opposite edges to the longer sides. Preferably, its separation from the shorter sides is maintained constant throughout the closed loop. In operation, a steady magnetic field is applied to this ferrite material in the direction perpendicular to its length and perpendicular to its shortest dimension, i. e., in a direction parallel with the axis of the closed loop. Fig. 2 shows one simple means for applying the magnetic field in the required fashion, namely, by the provision of an electromagnet 4 having two oppositely disposed pole pieces, each of which is shaped as by machining to a form the same as that of the wave guide structure. When the wave guide structure 1 is placed between the poles and when the magnet is energized as by a coil 5 and a current source 6, the magnetic flux has the required configuration. The ferrite material itself, of which the strip is made, may be of any suitable variety. Materials having the necessary properties are discussed in the publication referred to above and in the footnotes thereto.

The wave guide structure of Fig. 1 is provided with three ports, A, B, C, which give access to the closed path 2 by way of apertures in the outer short side of the re-entrant wave guide structure 1. These ports are equally spaced apart in the electrical sense. As illustrated, they are also equally spaced apart, namely, by 120 degrees, in the geometrical sense, although this is principally for the sake of simplicity of illustration, and is not essential.

With any particular combination of the material and dimensions of the ferrite strip 3 and the strength of the magnetic field applied to it, the re-entrant waveguiding structure of Fig. 1 is characterized by two different phase velocities for waves progressing around the closed path 2 within it. One of these phase velocities exceeds the normal phase velocity $v_0$, which would obtain within the guide without the ferrite and the field, by the phase velocity differential $\Delta v$. The other is reduced as compared with $v_0$ by the same amount. The effect of such phase velocity differential is to elongate the length $\lambda$ of a wave progressing around the closed path in one direction, here illustrated as the clockwise direction, and to shorten the length of a wave of the same frequency progressing around the path in the opposite direction. Given a desired frequency of operation, the phase velocity differential may be adjusted, as by controlling the strength of the magnetic field, to a magnitude such that the number of wavelengths in one angular direction embraced within the closed loop path 2 differs from the number of wavelengths in the opposite angular direction embraced within the closed loop path by an odd number of half wavelengths. In the present example, the closed path embraces nine full wavelengths in the counterclockwise direction and seven and one-half wavelengths in the clockwise direction.

Various other phase velocity and wavelength relations around the closed path as a whole are possible. They are succinctly stated by the following equation for the possible values of the differential phase velocity:

$$\frac{\Delta\lambda}{\lambda_0}=\frac{\Delta v}{v_0}=\frac{2m-n}{2m+n}$$

where $m$ is any integer
$n$ is any odd integer

Under these conditions, consider the operation when energy of this frequency is applied at the port A and so obtains access to the closed path. It travels around the loop 2 in both directions, its waves being elongated in the clockwise direction and shortened in the counterclockwise direction. It reaches the port B after traveling for three full wavelengths in the counterclockwise direction and five full wavelengths in the clockwise direction. The waves traveling by these two paths thus meet at the port B in phase coincidence, i. e., they are in additive relation, thus in effect making for a source of energy at this point of the closed path. They therefore tend to proceed outward through the port B and to whatever impedance element or network may be connected thereto. Thus, a source connected to the port A and a load connected to the port B have been effectively coupled together.

The same energy, entering the closed path by the port A, travels as a wave in both directions around the loop 2 to the port C. In following the counterclockwise path, it arrives there after six full wavelengths; in following the clockwise path it arrives there after two and one-half wavelengths. The two waves which travel by these two paths thus meet at the port C in phase opposition, and from the standpoint of apparatus connected to the port C, tend to cancel one another. Hence, there is no substantial transmission from A to C, and apparatus connected to the port A has been effectively decoupled from apparatus connected to the port C. The apparatus of Fig. 1 may thus appropriately be designated an "electromagnetic microwave isolator."

The electromagnetic wave energy confined within a hyperfrequency wave guide of nonsquare rectangular cross section is polarized, the electric vector extending parallel with the shorter sides and normal to the longer sides. In consequence of this, wave energy entering such a guide by way of an aperture in its shorter side progresses laterally in the two opposite directions in phase. Such is the case with any one of the ports of the apparatus of Fig. 1. However, energy may also be caused to enter or leave such a structure by way of an aperture in one of its longer sides, in which case the energy which progresses laterally has one phase condition for progress in one direction and the opposite phase condition for progress in the other direction. It is on these considerations that the T-junction form of the wave guide hybrid is based. Such a structure is disclosed in Tyrrell Patent 2,445,895 and is shown on page 340 of the Southworth book referred to above.

Figure 3:
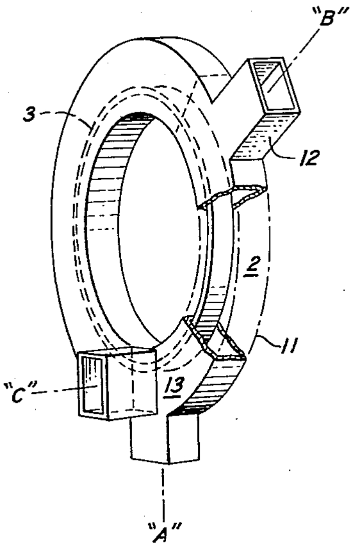
Fig. 3 is a perspective view, partly in section, of a hyperfrequency electromagnetic wave guide structure alternative to that of Fig. 1.

By employing such a T-junction at one point of the closed nonreciprocal wave propagation path, it becomes possible to obtain the performance of the apparatus of Fig. 1 with only one additional port. Fig. 3 shows such a structure.

It will be recognized that the structure of Fig. 1 is a symmetrical one, and comprises three rectilinear portions of equal length intercoupled by three similar 3-port fittings. Fig. 3, on the other hand, shows an asymmetrical structure comprising two rectilinear portions 10, 11 of unequal lengths intercoupled by two different fittings 12, 13, one of which 12 is a simple 3-port coupler as in the case of Fig. 1, while the other 13 is the more refined T-junction hybrid of the Tyrell patent.

The ports A and B are located as in Fig. 1. The port C, however, instead of being located on the short side midway between ports A and B, as in Fig. 1, is located at the same part of the closed path 2 as the A port but on the long side of the guide. In operation, energy entering the A port emerges at the B port, energy entering the B port emerges at the C port, and energy entering at the C port emerges at the A port, as before. The structural differences between the apparatus of Fig. 3 and that of Fig. 1 make for greater convenience of operation in some conditions.

If due allowance is made for the difference in phase conditions above referred to, a symmetrical 3-port structure may be employed having three equally spaced ports in the longer side of the re-entrant wave guide structure but being otherwise similar to Fig. 1.

Figure 4:
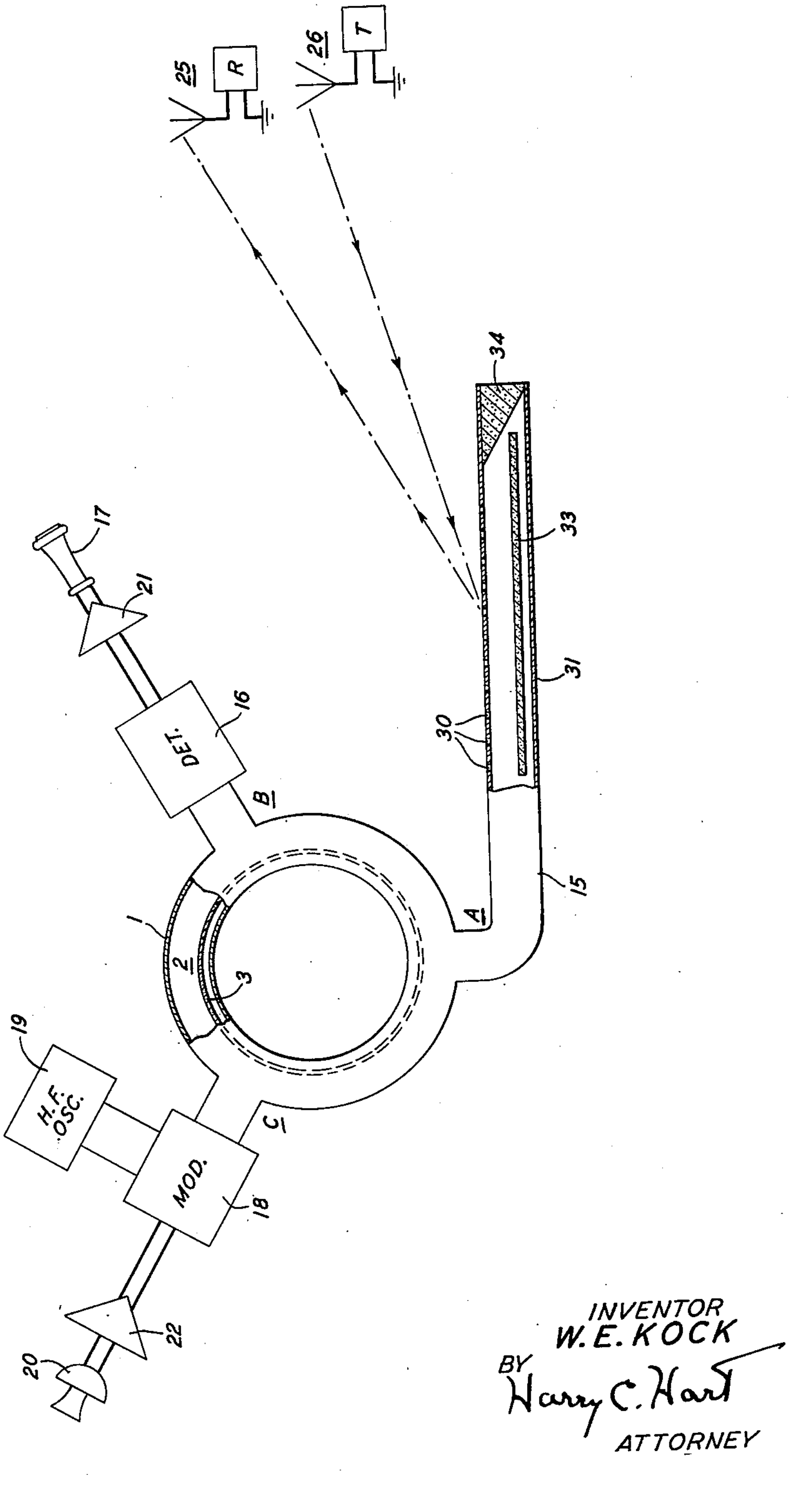
Fig. 4 is a schematic diagram showing a hyperfrequency electromagnetic wave communication system embodying the apparatus of Fig. 1.

Fig. 4 shows a hyperfrequency electromagnetic wave telephone transmission system which turns the nonreciprocal phase velocity isolator of Fig. 1 to account. Here the A port of the re-entrant wave guide structure is connected to a conventional hyperfrequency wave guide 15, the B port is connected by way of a detector 16 to a telephone receiver 17, and the C port is connected by way of a modulator 18, energized by a high frequency oscillator 19, to a telephone transmitter 20. Amplifiers 21, 22 may be connected in conventional fashion in tandem with the transmitter and the receiver. A magnetic field is applied by means, which may be as shown in Fig. 2, to the strip 3 of ferrite material which extends completely around the closed path 2, and its strength is coordinated with the wave frequency as described above. In operation a signal to be transmitted to a distant station 25, and originating, for example, at the instrument 20, is modulated on hyperfrequency waves which may be generated by the conventional high frequency oscillator 19 and are introduced into the C port. The wave energy travels around the closed path 2 in both directions. By reason of the unequal phase velocities in the two directions, the energy arriving at the A port by way of each of these two paths finds itself in phase coincidence with that arriving by way of the other, so that the telephone transmitter 20 is effectively coupled to the outgoing wave guide 15. Likewise, incoming energy which may originate at another remote station 26 finds access to the closed path at the A port and emerges at the B port where, after detection accompanied, if desired, by amplification, it is delivered to the telephone receiver 17. In each case, the desired transmission from the telephone transmitter 20 to the line 15 or from the line 15 to the telephone receiver 17 is exclusive of undesired coupling to the other one of these two elements, and this result is achieved without resort to any dummy load such as the balancing net which is required with a conventional hybrid structure.

The energy outgoing on the conventional hyperfrequency wave guide may be transmitted to the remote station in any desired fashion. For the sake of illustration, it is shown as taking place by radiation from a number of apertures 30 in one wall of a rectilinear wave guide structure 31 which are equally spaced apart lengthwise of the guide. As is well known, such a "leaky guide" structure constitutes a highly directional radiator of electromagnetic energy, and its directional characteristic is determined by the spacing between the apertures and the ratio of the wave propagation speed in open space to that within the guide. Such leaky guide radiator structures are shown and described, for example, in "Principles and Applications of Waveguide Transmission" by G. C. Southworth (Van Nostrand, 1950). They are also described in W. P. Mason Patent 2,408,435.

In accordance with the principles of the present invention, the wave guide structure 31 is provided with a strip 33 of ferrite material which extends between its two longer sides, parallel with its shorter sides and unequally separated therefrom, and the latter is subjected to the influence of a steady magetic field in any convenient fashion. The position and construction of the ferrite strip and the strength of the magnetic field determine two different phase velocities within the guide 31 for waves progressing in opposite directions within it. For a particular frequency of the energy applied thereto and a particular spacing among the several laterally disposed apertures 30, these two phase velocities determine two directions of high sensitivity, one of which obtains for transmission, as to a remotely located receiver station 25, while the other obtains for reception, as from a remotely located transmitter station 26. To ensure that the apertured wave guide shall carry principally traveling waves and that the wave pattern within it shall not form standing waves, its remote end is preferably terminated in an absorbing impedance element 34 and its near end termination is preferably such as to effect a substantial impedance match with the re-entrant structure at the A port.

It is sometimes desired to carry on a two-way conversation from a local telephone transmitter to a distant receiver and from the distant transmitter to the local receiver by way of a high frequency beam of acoustic compression waves. This requirement introduces the problem of undesired acoustic coupling between the local transmitter and the local receiver. This problem is solved in accordance with another aspect of the invention by the apparatus of Fig. 5, which includes an acoustical counterpart of the apparatus of Fig. 1. Here a pipe 41 of any desired cross section, adapted to support compression wave energy in a fluid such as air, is returned on itself to define a closed path 42. It is provided with three ports, identified as A, B and C. To achieve the required inequality of phase velocities in the two opposite angular directions around the closed path, the medium which supports the waves may be bodily transported, as by causing a current of air to flow around the closed path 42 in one direction. To this end a paddle wheel or turbine may be mounted centrally of the path whose periphery bears vanes 43 which extend through the pipe wall into its interior to move the air therein at a speed which may be adjusted to the required value by control of a driving motor 44. The considerations of addition and subtraction of wave energy at the several ports are identical with those which hold with respect to the apparatus of Fig. 1, provided only that the air stream speed be appropriately coordinated with the frequency of the wave energy. With this proviso, compression wave energy entering the structure by way of the A port emerges at the B port; energy entering by way of the B port emerges at the C port; and energy entering at the C port emerges at the A port.

If preferred, the air which carries the compression waves may be bodily transported as by containing it in a toroidal screen which is borne on the circumference of a disc or spider which in turn is centrally mounted for rotation within the wave guide structure. Experiment has shown that conventional window screen material serves well for the bodily transport of a volume of air within it while permitting easy ingress thereto and egress therefrom of compression wave energy such as that applied to and withdrawn from the ports of the apparatus.

Either of these forms of acoustic isolator apparatus may serve to decouple the local telephone transmitter 20' from its receiver 17' while establishing strong coupling from the transmitter 20' to the outgoing wave guide 45 and from the guide 45 to the receiver 17'. With apparatus of dimensions of practically convenient magnitudes, such a system is operative in the frequency range 10,000–50,000 cycles per second.

The electrical output of a telephone transmitter 20' carrying electric signals of voice frequencies may be amplified and applied to a modulator 18' which modulates them onto carrier frequency oscillations derived from a source 19'. The resulting modulated oscillations are converted into compression waves by a transducer 23 and introduced into the re-entrant wave guide structure 41 at the C port. Similarly, high frequency compression wave energy within the re-entrant structure may be withdrawn at the B port, converted into voice-modulated electrical oscillations by a transducer 24, whereupon a detector 16' may pick out the modulations and supply them as audio signals to a reproducer 17'. The A port is coupled directly and without any transducer to a pipe 45 which in turn is coupled to a leaky pipe radiator 51. As in the case of the electromagnetic radiator of Fig. 4, the leaky pipe radiator, a fully reciprocal form of which is shown in Mason Patent 2,406,391, radiates directionally to a receiver at an angle determined by the spacing between apertures 50 and the propagation speed of compression waves within the guide. In accordance with the present invention, an air current is caused to flow within the guide 51 as by the coupling thereto of a centrifugal blower 52 driven by a motor 53. The air current thus flows from left to right in the pipe 51, which makes for a wave propagation speed within the pipe which, for the left-right direction, exceeds the speed of sound in still air, and which is diminished, as compared with the speed of sound in still air, for propagation in the right-to-left direction. These unequal phase velocities make for greatest transmitted power in one direction, for example, toward the receiver station 25', and for greatest sensitivity to incoming compression waves arriving from another direction, for example, from the transmitter station 26'.

Figures 5, 6:
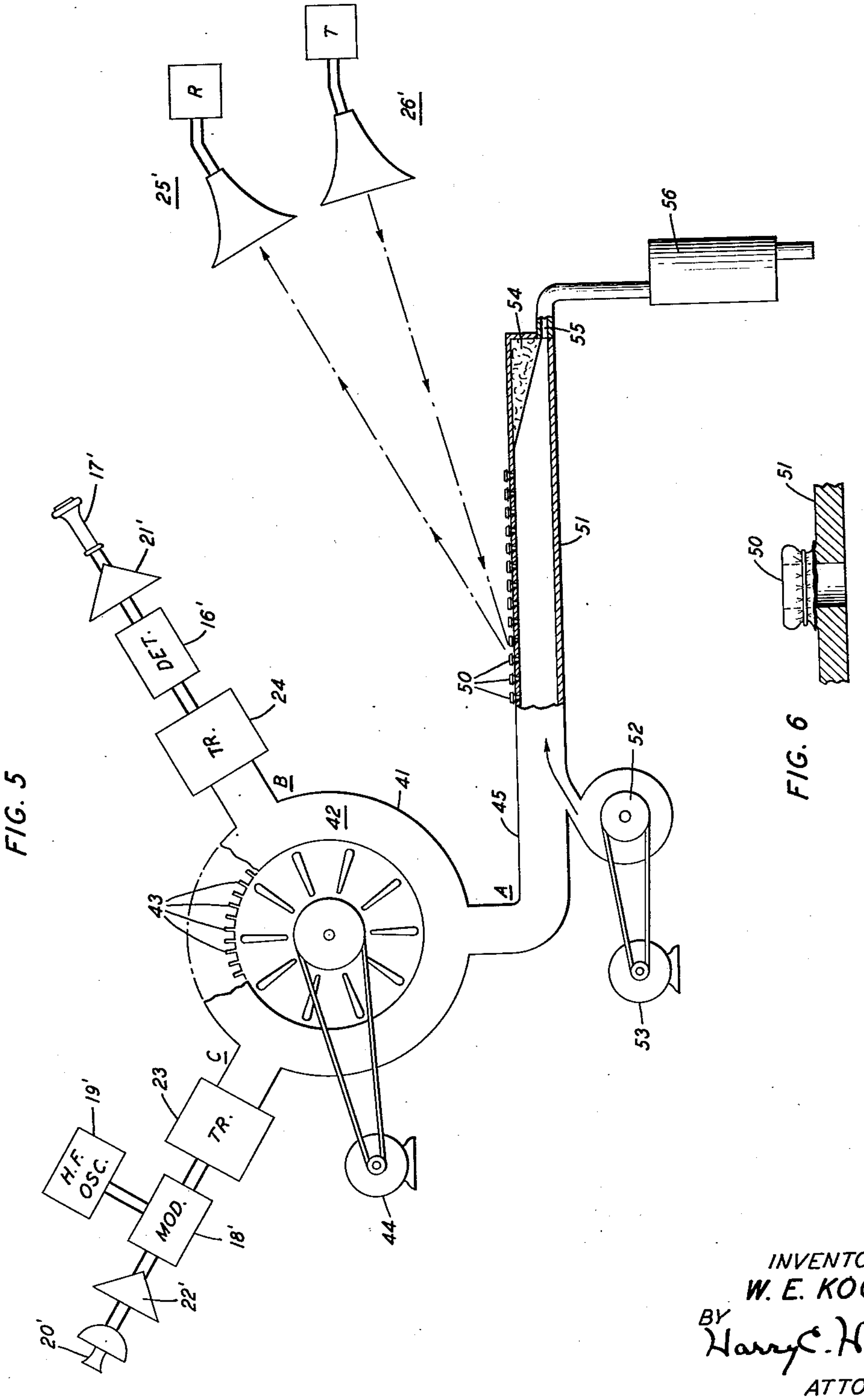
Fig. 5 shows an acoustical counterpart of the apparatus of Fig. 4 as employed in a carrier frequency telephone system.
Fig. 6 shows a detail of Fig. 5.

As in the case of the electromagnetic system of Fig. 4, the impedance of the leaky pipe radiator 51 is preferably matched in well known fashion to that of the closed path 42. In addition, the leaky pipe radiator is preferably terminated at its far end by an absorptive impedance element 54 to provide a minimum of reflection at that point and thus to avoid the setting up of standing waves within it. It may be provided with a leak 55 and a muffler 56 to permit escape of the steady air current while retaining the energy of vibration. Contrariwise, the apertures 50 may be provided with yielding caps as shown in Fig. 6 to prevent the escape of steady air currents therefrom while permitting the radiation of vibratory acoustic energy.

The invention, which has been illustrated by way of two different kinds of wave phenomena, is in principle applicable to any situation wherein waves of any sort travel by way of two different paths from a first point to a second point and to a third point, and wherein the phase velocities may be adjusted to bring the waves arriving by way of these two paths into phase coincidence at the second point and phase opposition at the third point.

What is claimed is:

1. A re-entrant wave-guiding structure defining a closed loop path for wave energy therein, means for establishing a phase velocity of one magnitude for waves advancing in one direction along said path and a phase velocity of a different magnitude for waves advancing in the opposite direction along said path, said loop having only three ports spaced therearound for providing access to said loop path at different points thereof, means for introducing wave energy of a preassigned frequency at a first port, whereupon said energy is propagated in both directions along said path to each other port, said frequency being so coordinated with said different phase velocities and with the spacings among said ports that the wave energies reaching said other ports from said two different directions are in additive relation at a second port and in phase opposition at the third port.

2. Apparatus as defined in claim 1 wherein the re-entrant wave-guiding structure is a hyperfrequency electromagnetic wave guide.

3. Apparatus as defined in claim 2 wherein the means for establishing said unequal phase velocities comprises a strip of ferrite material located within said re-entrant wave-guiding structure and means for subjecting said strip to a magnetic flux.

4. Apparatus as defined in claim 2 wherein said wave-guiding structure is of rectangular cross section having two longer sides and two shorter sides.

5. Apparatus as defined in claim 4 wherein the means for establishing the unequal phase velocities comprises a strip of ferrite material extending lengthwise throughout the length of said closed loop path and sidewise from one of said longer sides of said wave guide structure to the other of said longer sides, and located at unequal distances from said shorter sides.

6. Apparatus as defined in claim 4 wherein the first, the second and the third ports obtain access to the closed path within the re-entrant structure by way of apertures in one of the shorter sides, said apertures being spaced apart around said path at equal distances.

7. Apparatus as defined in claim 4 which comprises a symmetrical structure of three rectilinear portions of substantially equal lengths intercoupled by three like 3-port coupling fittings.

8. Apparatus as defined in claim 4 which comprises two rectilinear portions, the length of one of which is substantially twice the length of the other, said two portions being intercoupled by way of a first fitting having three ports on its shorter sides and a second fitting having three ports on its shorter sides and one port on its longer side.

9. Apparatus as defined in claim 4 wherein two of said ports are located at substantially the same point of said closed loop path, one of said ports obtaining access to said path by way of an aperture in a shorter side of the re-entrant wave guiding structure and the other by way of an aperture in a longer side of said structure.

10. Apparatus as defined in claim 1 wherein the waves which are propagated within the closed path are fluid compression waves.

11. Apparatus as defined in claim 10 wherein the unequal phase velocities for said compression waves are secured by the movement of a current of air in one direction around said closed path.

References Cited in the file of this patent

UNITED STATES PATENTS 2,436,828 Ring ------------------- Mar. 2, 1948

OTHER REFERENCES

Article: "A Nonreciprocal Microwave Component" by Kales et al., pub. in Journal of Applied Physics, vol. 24, No. 6, June 1953, pages 816–817.